United States Patent
Yen

(10) Patent No.: US 10,255,842 B2
(45) Date of Patent: Apr. 9, 2019

(54) DISPLAYING SYSTEM HAVING A FUNCTION OF SENSING DISPLAYING PROPERTIES

(71) Applicant: QISDA CORPORATION, Taoyuan (TW)

(72) Inventor: Chung-Ting Yen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 83 days.

(21) Appl. No.: 15/297,153

(22) Filed: Oct. 19, 2016

(65) Prior Publication Data

US 2017/0110047 A1    Apr. 20, 2017

(30) Foreign Application Priority Data

Oct. 20, 2015    (TW) .............................. 104134283 A

(51) Int. Cl.
| | | |
|---|---|---|
| *G09G 3/20* | (2006.01) | |
| *G09G 5/14* | (2006.01) | |
| *G02F 1/133* | (2006.01) | |
| *G02F 1/13* | (2006.01) | |
| *G09G 3/36* | (2006.01) | |

(52) U.S. Cl.
CPC ....... *G09G 3/2092* (2013.01); *G02F 1/13318* (2013.01); *G09G 5/14* (2013.01); *G02F 1/1309* (2013.01); *G09G 3/36* (2013.01); *G09G 2320/066* (2013.01); *G09G 2320/0626* (2013.01); *G09G 2320/0666* (2013.01); *G09G 2320/0693* (2013.01); *G09G 2320/08* (2013.01); *G09G 2360/145* (2013.01)

(58) Field of Classification Search
CPC .............. G09G 3/006; G09G 3/36; G01J 1/32
See application file for complete search history.

(56) References Cited

U.S. PATENT DOCUMENTS

| | | | | |
|---|---|---|---|---|
| 2008/0198297 A1* | 8/2008 | Choi | ................... | G02B 6/0031 349/65 |
| 2010/0085506 A1* | 4/2010 | Kim | ..................... | G02B 6/0083 349/61 |
| 2011/0175569 A1* | 7/2011 | Austin | ................ | B60L 11/1824 320/109 |

(Continued)

FOREIGN PATENT DOCUMENTS

| | | |
|---|---|---|
| CN | 1991560 A | 7/2007 |
| CN | 103412417 A | 11/2013 |
| TW | 201401247 A | 1/2014 |

*Primary Examiner* — Ryan A Lubit

(57) ABSTRACT

A displaying system having a function of sensing displaying properties includes a displaying panel, a controlling module, and an optical sensor. The displaying panel has a displaying surface which includes a presentation area and a function area. The function area is at a side of the displaying panel. The function area has a length in pixels longer than that of the presentation area. The controlling module is electrically connected to the displaying panel and the optical sensor and controls the displaying panel to display a presentation image displayed on the displaying area and an image for inspection on the function area. The optical sensor is disposed corresponding to the function area and senses the image for inspection to generate an inspection signal relative to the image for inspection. Thereby, the controlling module can further adjust displaying parameters of the displaying panel.

18 Claims, 12 Drawing Sheets

(56) References Cited

U.S. PATENT DOCUMENTS

2013/0161498 A1* 6/2013 Kawata ................ G01J 1/0425
250/227.31
2013/0314387 A1 11/2013 Kwack

* cited by examiner

DISPLAYING SYSTEM HAVING A FUNCTION OF SENSING DISPLAYING PROPERTIES

BACKGROUND OF THE INVENTION

1. Field of the Invention

The invention relates to a displaying system, and especially relates to a displaying system having a function of sensing displaying properties.

2. Description of the Prior Art

Displaying parameters (such as hue, saturation, luminance, contrast, brightness and so on) of conventional monitors usually can be set through an OSD function of the monitors. Users generally set the displaying parameters of the monitors according to their senses. After adjusted by the user, the monitor displays images whose colors are not necessarily associated with the original colors in which the images are expected to be displayed. Hence, the above setting mechanism cannot substantially treat problems of color shift. In practice, calibration of the displaying parameters of the monitors usually needs external inspection. When a monitor needs to be calibrated, the monitor has to display images in corresponding colors on its screen. Then a probe of a measurement device has to face the screen for measuring the color of the image displayed on a portion of the screen which the probe faces. Measurement data are taken as the basis for adjusting the displaying parameters of the monitor. Because of seldom use of the measurement device, general users usually would not prepare a device like the measurement device. When a monitor needs to be calibrated, the monitor is usually moved to a specific place for the calibration. For example, a monitor has been a calibrated before leaving a factory. If the monitor needs to be calibrated after sold to a customer, the monitor has to be moved back to a maintenance center for calibration, which spends much time and is inconvenient.

SUMMARY OF THE INVENTION

An objective of the invention is to provide a displaying system having a function of sensing displaying properties. The displaying system has a built-in optical sensor for sensing an area of a displaying panel for inspecting the displaying properties of the displaying panel; therein, the area is not used for displaying images to the outside.

A displaying system having a function of sensing displaying properties according to invention includes a displaying panel, a controlling module, and an optical sensor. The displaying panel has a displaying surface. The displaying surface includes a presentation area and a function area. The function area is at a side of the displaying panel. The function area has a first length in pixels parallel to the side. The presentation area has a second length in pixels parallel to the side. The first length in pixels is longer than or equal to the second length in pixels. The controlling module is electrically connected to the displaying panel and the optical sensor. The controlling module controls the displaying panel to display a presentation image in the presentation area and an image for inspection in the function area. The optical sensor is disposed corresponding to the function area. The optical sensor senses the image for inspection to generate an inspection signal relative to the image for inspection. Therein, the presentation image is an image provided for users to watch, and the image for inspection is an image provided for the optical sensor to sense. The two images do not overlap or interfere with each other. Furthermore, the controlling module can adjust the displaying parameters according to the inspection signal.

Compared with the prior art, the displaying system according to the invention has its own optical sensor which can directly sense the displaying properties of the displaying panel, so it is unnecessary to calibrate the displaying panel at a specific place. Therefore, the calibration of the displaying panel saves time. Furthermore, regarding the displaying surface of the displaying panel, the area (i.e. an inspection area) which the optical sensor senses is not the area (i.e. the presentation area) for displaying presentation images. When the optical sensor operates, the operation will not influence the displaying of images and the images are displayed normally so that the user still can watch the full images. Further, when the controlling module adjusts the displaying parameters according to the inspection signal, the user also can watch images affected by the adjusted displaying parameters.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
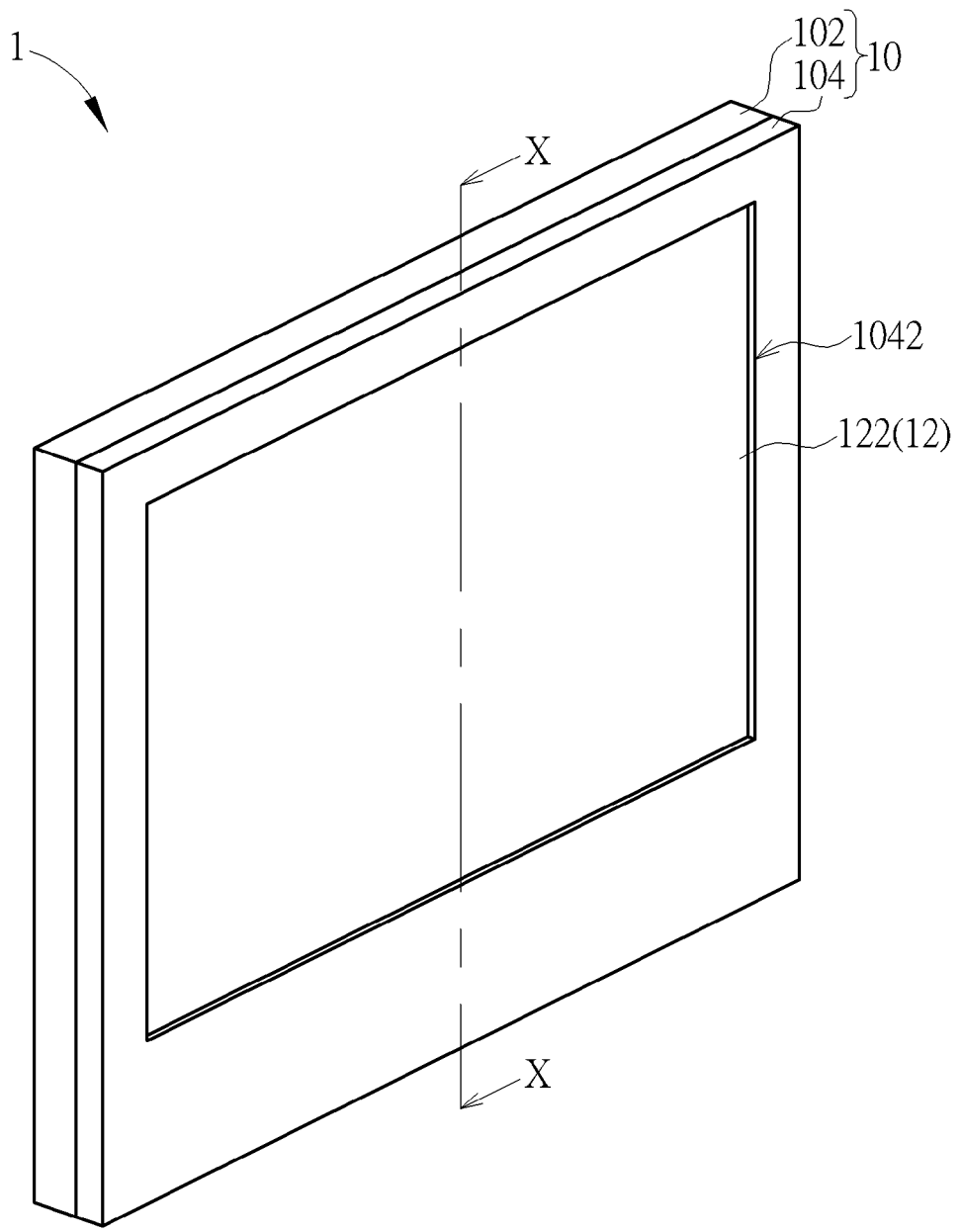
FIG. 1 is a schematic diagram illustrating a displaying system having a function of sensing displaying properties of an embodiment according to the invention.
Figure 2:
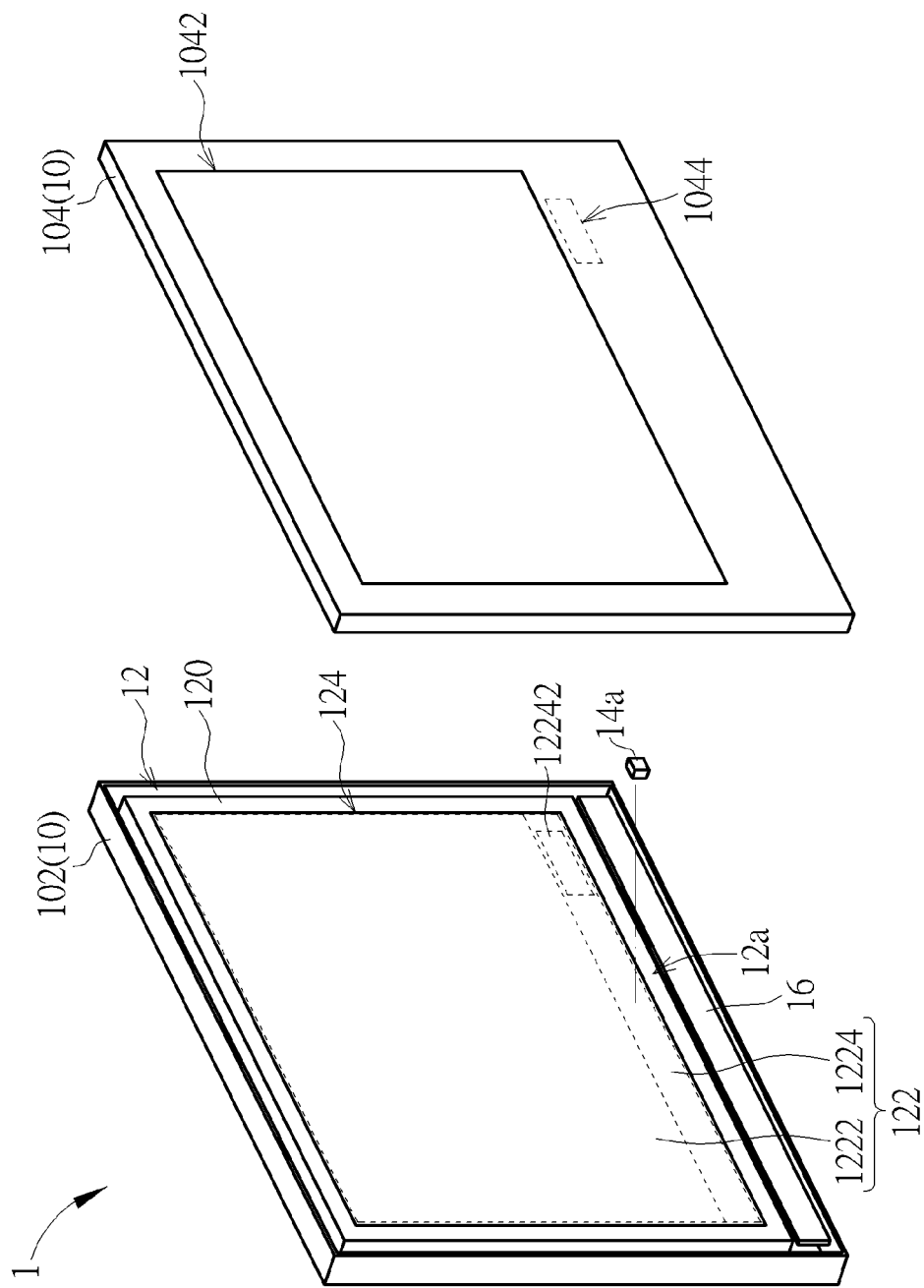
FIG. 2 is a partially exploded view of the displaying system in FIG. 1.
Figure 3:
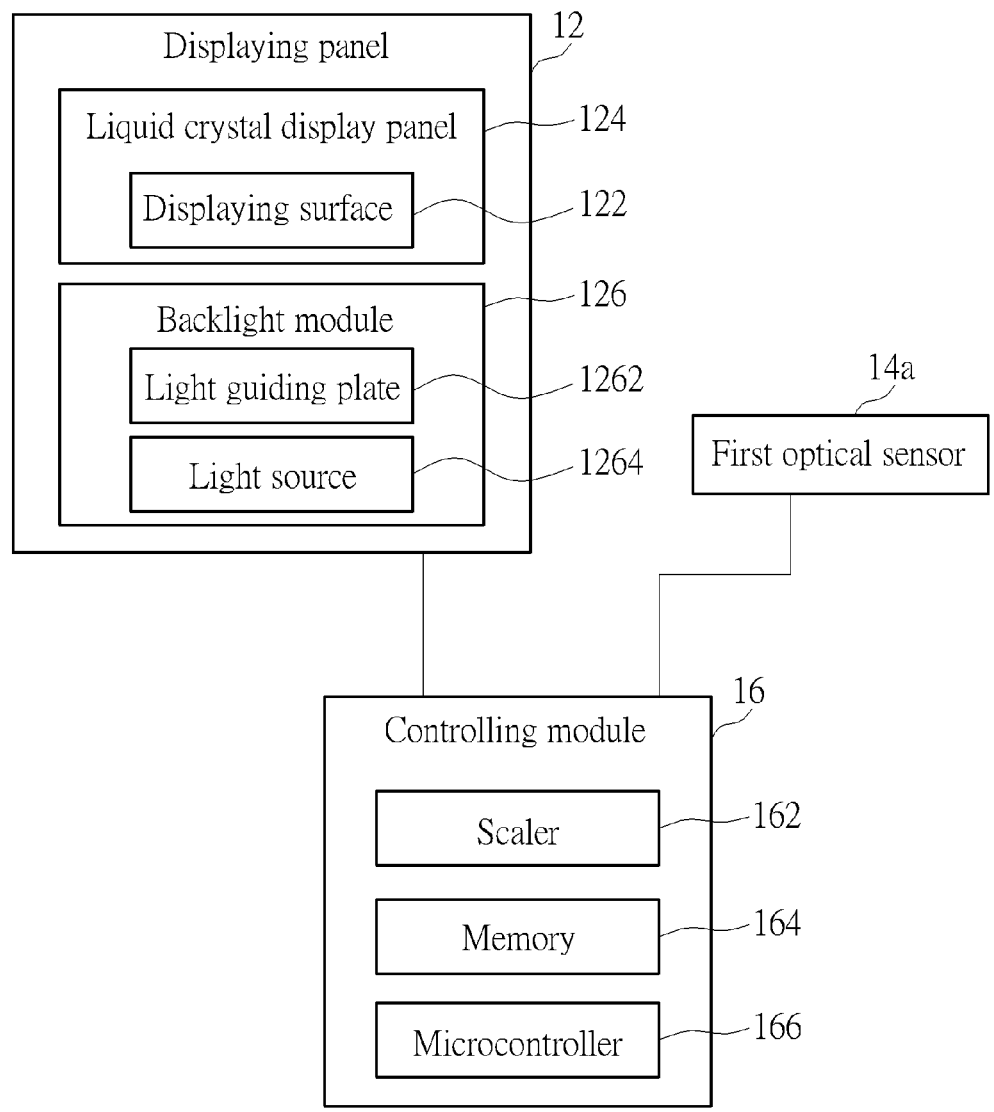
FIG. 3 is a function block diagram of the displaying system in FIG. 1.
Figure 4:
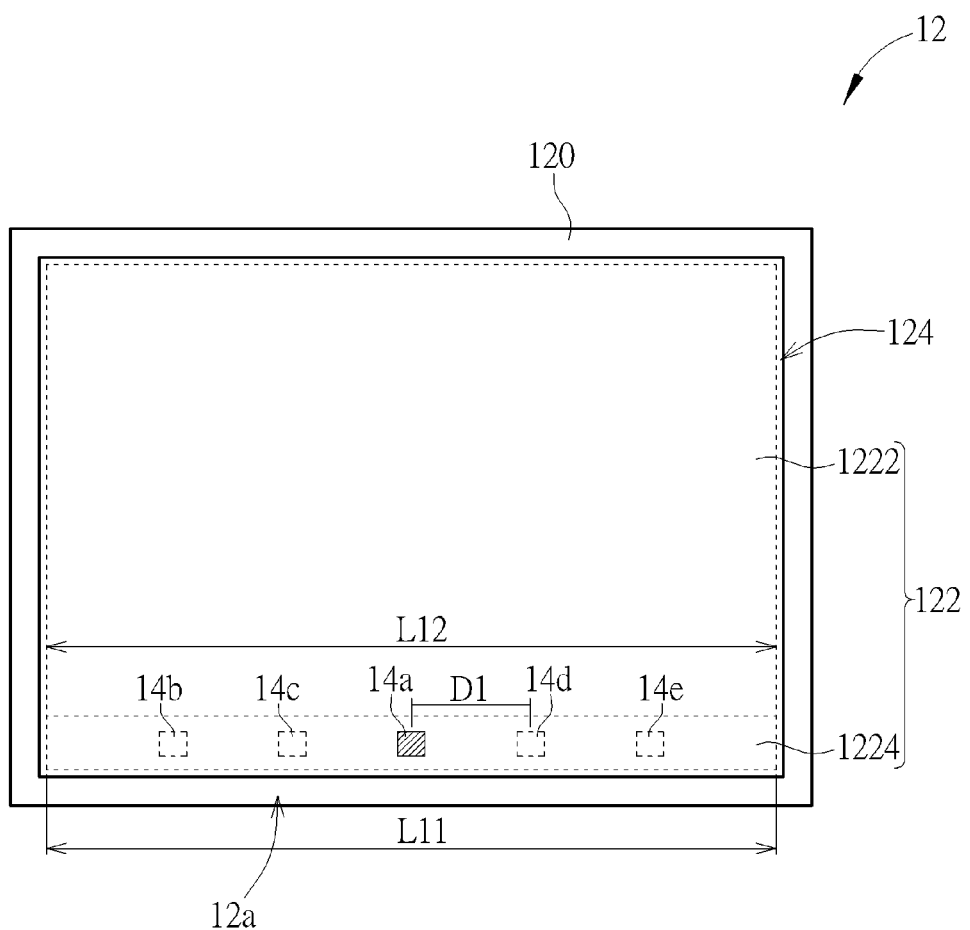
FIG. 4 is a front view of a displaying panel of the displaying system in FIG. 1.

Please refer to FIG. 1 to FIG. 4. A displaying system 1, having a function of sensing displaying properties, of an embodiment according to the invention includes a casing 10, a displaying panel 12, a first optical sensor 14a, and a controlling module 16. The controlling module 16 is electrically connected to the displaying panel 12 and the first optical sensor 14a. The casing 10 includes a back cover 102 and a frame 104. The back cover 102 and the frame 104 are engaged with each other and form an accommodating space for accommodating the displaying panel 12, the first optical sensor 14a, and the controlling module 16. The frame 104 forms a window 1042 to expose the displaying panel 12. The displaying panel 12 includes a fixing frame 120. The fixing frame 120 is used for fixing the displaying panel 12. The displaying panel 12 has a displaying surface 122 for displaying images. Therein, in principle, any surface area of the displaying panel 12 which is used for displaying images constitutes at least a portion of the displaying surface 122. The displaying surface 122 includes a presentation area 1222 and a first function area 1224 (which are presented by rectangles in dashed lines in the figures). The first function area 1224 is located at a first side 12a of the displaying panel 12. Therein, the first function area 1224 extends parallel to the first side 12a, but the invention is not limited thereto. The frame 104 surrounds the displaying panel 12 so that the presentation area 1222 is exposed through the window 1042 and the first function area 1224 is covered by the frame 104. That is, a user can see the presentation area 1222 but not the first function area 1224. The first optical sensor 14a is disposed corresponding to the first function area 1224. In FIG. 4, a projection of the first optical sensor 14a on the first function area 1224 is presented by a hatched rectangle. The controlling module 16 controls the displaying panel 12 to display a presentation image within the presentation area 1222 and display a first image for inspection within the first function area 1224. Therein, the presentation image is taken as an image for the user to watch for achieving the purpose of the user's using the displaying system 1; the first image for inspection is used for sensing displaying properties of the displaying panel 12 by the first optical sensor 14a. Thereby, the presentation image and the first image for inspection do not interfere with each other, so that when the user watches the presentation image, the first optical sensor 14a can sense the first image for inspection and then generate a first inspection signal relative to the first image for inspection simultaneously. The controlling module 16 can receive the first inspection signal from the first optical sensor 14a and control the displaying panel 12 to displaying the presentation image within the presentation area 1222 according to the received first inspection signal. That is, the controlling module 16 adjusts displaying parameters (such as hue, saturation, luminance, contrast, brightness and so on) of the displaying panel 12 according to the first inspection signal. In practice, the controlling module 16 can dynamically adjust the displaying parameters of the displaying panel 12 according to the first inspection signal, so that the presentation image can be displayed in correct colors. Additionally, in the embodiment, the first image for inspection can be but not limited to being displayed in a full red frame, a full green frame, and a full blue frame in order for sensing intensities of red color light, green color light, and blue color light respectively, or displayed in a full white frame for sensing the intensities of red color light, green color light, and blue color light by a plurality of optical sensors (which will be described later). In practice, the content (such as actual colors, patterns and so on) of the first image for inspection depends on an inspection method to be used, which will be not described further. In addition, in practice, the first image for inspection can be a duplication of a portion of the presentation image, which is conducive to an adjustment of the displaying parameters of the displaying panel 12 according to the presentation image, for example for enhancing the contrast of the presentation image. Furthermore, in practice, the image displayed on the first function area 1224 (including the first image for inspection) and the image displayed on the presentation area 1222 (including the presentation image) can be combined into an image which is transmitted to the displaying system 1 and displayed by the displaying panel 12 under the control of the controlling module 16. For example, the image displayed on the first function area 1224 is displayed by a sub window.

Figure 5:
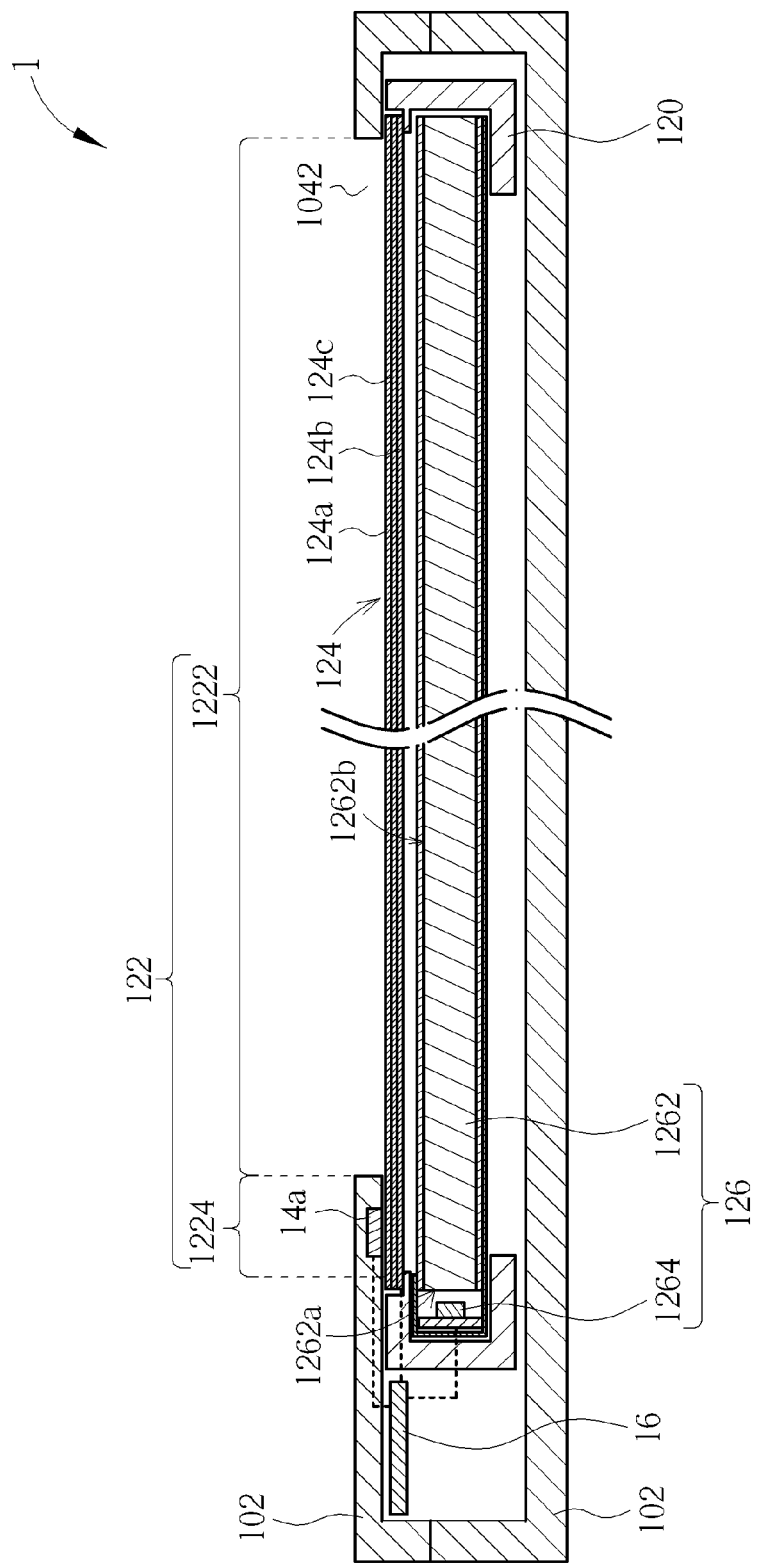
FIG. 5 is a sectional view of the displaying system along the line X-X in FIG. 1.

In practice, the displaying panel 12 can be realized by a liquid crystal display and includes a liquid crystal display panel 124 and a backlight module 126 for providing back light for the liquid crystal display panel 124, which are electrically connected to the controlling module 16, as shown by FIG. 5. The liquid crystal display panel 124 has two transparent plate substrates 124a and 124b, two electrode layers (skipped in FIG. 5 for simplification and electrically connected with a driving circuit, also skipped in FIG. 5) oppositely disposed on the two substrates 124a and 124b respectively, and liquid crystals 124c disposed between the two substrates 124a and 124b. The liquid crystals 124c are divided into a plurality of cells. Accordingly, the controlling module 16 can be realized by a common control module of an LCD monitor, which includes a scaler 162, a memory 164, and a microcontroller 166 electrically connected to the scaler 162 and the memory 164. The control module 16 drives the backlight module 126 and the liquid crystal display panel 124 to display images through the scaler 122. Furthermore, by controlling the electric field applied to each cell by the controlling module 16, the liquid crystals 124c in each cell can be arranged individually, so that the liquid crystal display panel 124 can selectively allow light from the backlight module 126 to pass through, the operation details of which can be understood by referring to the operation of a common LCD in the field and will not be described further in details herein. Therefore, in the embodiment, the displaying surface 122 is defined as the extent of the substrate 124a of the liquid crystal display panel 124 for displaying images. The backlight module 126 is disposed adjacent to the liquid crystal display panel 124 for providing the light. In practice, the backlight module 126 can be realized by, but not limited to a common backlight module for a common liquid crystal display panel, such as edge-lit backlight modules and back-lit backlight modules. In the embodiment, the backlight module 126 is an edge-lit backlight module and includes a light guiding plate 1262 (usually provided with optical films thereon), disposed adjacent to one of the transparent plate substrates 124a and 124b, and a light source 1264, disposed adjacent to an edge side 1262a of the light guiding plate 1262. The light source 1264 is a light bar (including a circuit board with a plurality of light-emitting diode devices electrically mounted thereon; therein, the circuit board includes a driving circuit for driving the light-emitting diode devices). In practice, the light source 1264 can be replaced with a cold-cathode fluorescent lamp or other device capable of providing light. The control module 16 controls the light source 1264 to selectively emit light through the driving circuit, for example but not limited to by powering the light source 1264 for emitting light and turning off the light source 1264 for not emitting light. The light enters the light guiding plate 1262 from the edge side 1262a and then emits out of a plan side 1262b of the light guiding plate 162 toward the liquid crystal display panel 124, so that the backlight module 126 provides a surface light to the liquid crystal display panel 124. Furthermore, in the embodiment, the liquid crystal display panel 124 and the backlight module 126 are fixed by a frame, i.e. the fixing frame 120. In addition, in the embodiment, the displaying panel 12 is realized by the liquid crystal display mentioned above, but the invention is not limited thereto. In principle, any displaying panel capable of displaying images through a displaying surface thereof is practicable, such as LED displays, plasma displays, electroluminescent displays and so on.

Furthermore, in practice, for the displaying surface 122, the portion exposed through the window 1042 of the frame 104 is defined as the presentation area 1222, and a part or the entire of the portion covered by the frame 104 can be partially or fully defined as the first function area 1224. In the embodiment, the first function area 1224 has a first length L11 in pixels parallel to the first side 12a. The presentation area 1222 has a second length L12 in pixels parallel to the first side 12a. The first length L11 in pixels is equal to the second length L12 in pixels. Therein, the length in pixels is defined as the amount of pixels within the segment length. In practice, the length also can be represented by other measurement units. In the embodiment, for the displaying panel 12, the area capable of displaying images thereon as a whole is divided into the presentation area 1222 and the first function area 1224; however, the invention is not limited thereto. In principle, the presentation area 1222 and the first function area 1224 do not interfere with each other. Furthermore, in practice, a gap area (not used for displaying images thereon) between the above two area can be reserved, so that any interference between the presentation image and the first image for inspection can be reduced, especially for the influence of the first image for inspection on the user's watching the presentation image. Furthermore, in practice, the gap area can substantially be disposed along an edge of the window 1042.

In addition, in practice, the displaying system 1 can use more optical sensors for increasing more sensed data at different positions of the first function area 1224 and reflecting the displaying properties of the whole displaying panel 12 more precisely. For example, as shown by FIG. 4, the displaying system 1 includes four second optical sensors 14b-e (the projections of which on the first function area 1224 are presented by rectangles in dashed lines) which are electrically connected to the controlling module 16 and disposed corresponding to the first function area. Each second optical sensor senses the first image for inspection and generates a corresponding second inspection signal relative to the first image for inspection. As shown by FIG. 4, the optical sensors 14a-e are disposed at an interval D1, so that the optical sensors 14a-e can be distributed substantially uniformly over the first function area 1224 and the first inspection signal and the second inspection signals generated by the optical sensors 14a-e can reflect the displaying properties of the whole displaying panel 12 more precisely. Additionally, in practice, the plurality of optical sensors 14a-e can sense the same image content, so that whether any of the optical sensors 14a-e works abnormally and is aged can be judged by comparing the generated signals. For example, if one of the optical sensors 14a-e generates an inspection signal with a deviation from the inspection signals generated by the others of the optical sensors 14a-e, said optical sensor 14a-e can be tentatively determined to be abnormal or aged. After receiving the first inspection signal and the second inspection signals, the controlling module 16 adjusts the displaying parameters of the displaying panel 12 according to the first inspection signal and the second inspection signals, so that the presentation image is adjusted. For example, the presentation image can be displayed in more real colors or for meeting a predetermined displaying requirement (e.g. enhancing contrast). As shown by FIG. 4, the optical sensors 14a-e are arranged at a constant interval (i.e. the interval D1) in a row parallel to the first side 12a; however, the invention is not limited thereto. For example, for different requirements, the optical sensors 14a-e can be relatively gathered at a central portion or two ends of the first function area 1224. For a case that the image displayed at the central portion of the presentation area 1222 is relatively important for use according to an application requirement of the displaying system 1, because the central portion of the first function area 1224 is relatively close to the central portion of the presentation area 1222, it is expectable that when the optical sensors 14a-e are relatively gathered at the central portion of the first function area 1224, the inspection signals generated by the optical sensors 14a-e can reflect the displaying properties of the central portion of the presentation area 1222 more precisely.

In the above descriptions, the optical sensors 14a-e are all disposed facing the first function area 1224; therein, the optical sensors 14a-e are located between the first function area 1224 and the frame 104. In principle, each optical sensor 14a-e only senses the right front area of the first function area 1224; however, the invention is not limited thereto. For example, each optical sensor 14a-e can increase the size of the sensed area of the first function area 1224 by using a structure capable of gathering or guiding light. Please also refer to FIG. 6 which is a sectional view of the displaying panel 12 at the first function area 1224; therein, the displaying panel 12 shown by a hatched rectangle with the fixing frame 120 at its ends for simplification of the drawing, which is also applied to FIG. 7 and FIG. 8. For the embodiment shown by FIG. 6, a light-guiding part 18 is disposed in front of the first optical sensor 14a. The light-guiding part 18 has a light inlet 182 and a first light outlet 184. The light inlet 182 right faces the first function area 1224. The first optical sensor 14a is disposed at the first light outlet 184. Thereby, light from the first image for inspection enters the light-guiding part 18 through the light inlet 182, exits out of the light-guiding part 18 through the first light outlet 184, and then is received by the first optical sensor 14a. In other words, the first optical sensor 14a senses the first image for inspection through the light-guiding part 18 and then generates the first inspection signal relative to the first image for inspection. In principle, the cross-sectional area of the light inlet 182 is larger than the cross-sectional area of the first light outlet 184. Thereby, the first optical sensor 14a senses a larger area of the first function area 1224.

In addition, an intensity loss to the light due to the transmission of the light by the light-guiding part 18 can be compensated by adjusting the intensity of the light received by the first optical sensor 14a. For example, a compensation equation or a look-up table can be set up on the basis of the intensity loss to the light due to the transmission of the light by the light-guiding part 18 in advance, and then the first inspection signal generated by the first optical sensor 14a can be adjusted according to the compensation equation or the look-up table. Additionally, because the first optical sensor 14a can sense the first image for inspection through the light-guiding part 18, the light-guiding part 18 can be designed in structure so that even when disposed away from the first function area 1224, the first optical sensor 14a still can effectively sense the first image for inspection, for example by using a bent light-guiding part.

Figure 6:
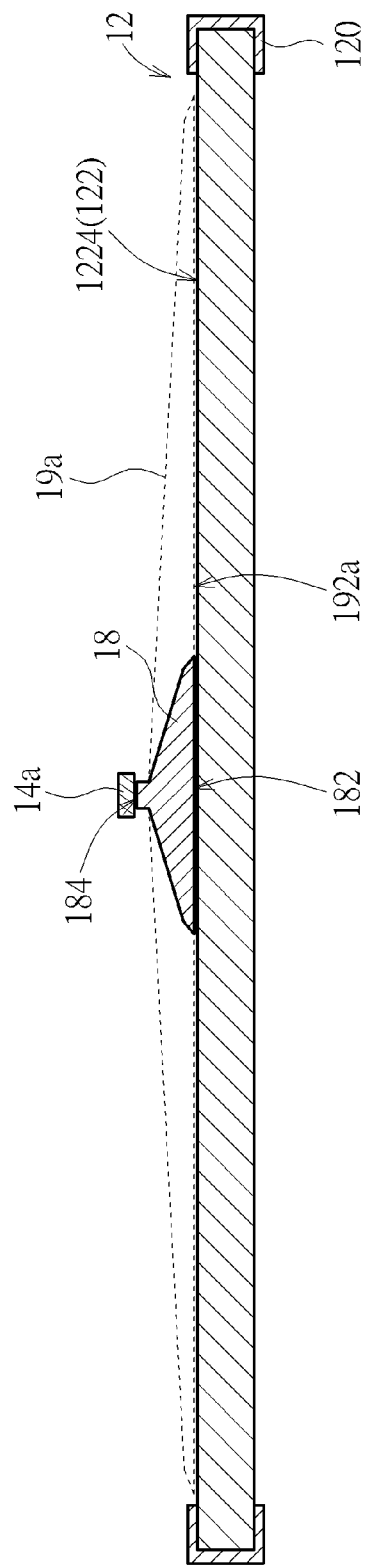
FIG. 6 is a sectional view of the displaying panel according to another embodiment in FIG. 4.
Figure 7:
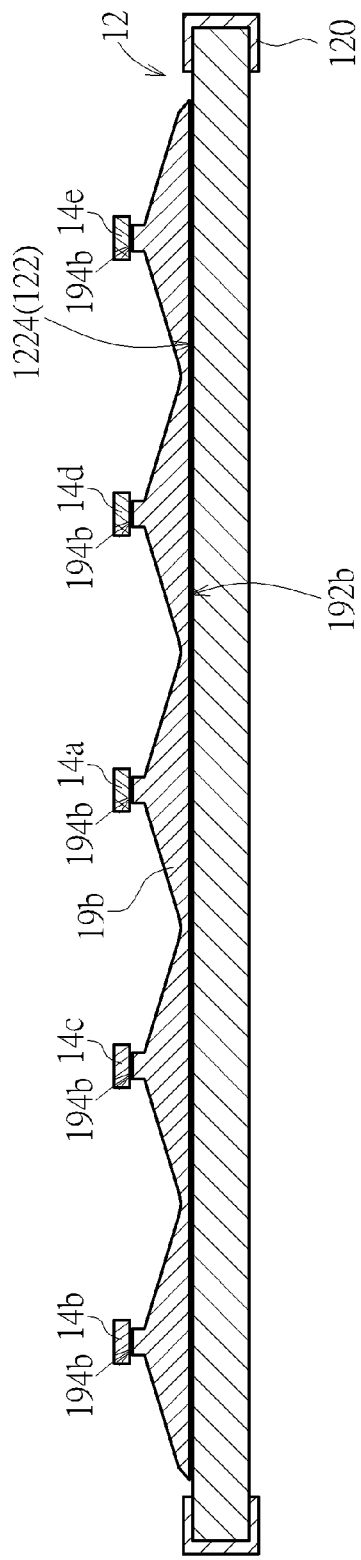
FIG. 7 is a sectional view of the displaying panel according to another embodiment in FIG. 4.

As shown by FIG. 6, the light inlet 182 of the light-guiding part 18 cannot cover the entire first function area 1224. However, in practice, the light inlet 182 can cover the entire the first function area 1224 by changing the shape and dimensions of the light-guiding part 18. As shown by a light-guiding part 19a shown by dashed lines in FIG. 6, a light inlet 192a of the light-guiding part 19a covers the first function area 1224, and a light outlet of the light-guiding part 19a is equivalent to the light outlet 184 in the figure. Thereby, the first optical sensor 14a can receive all light from the first image for inspection in principle; that is, the first inspection signal can reflect the displaying properties of the whole first function area 1224 in principle. When more optical sensors are used, the light-guiding part 18 can be modified to increase light outlets. As shown by FIG. 7, the optical sensors 14a-e are disposed above the first function area 1224 (similar to the disposition shown by FIG. 4). The optical sensors 14a-e use the same light-guiding part 19b. The light-guiding part 19b has a plurality of second light outlets 196b, corresponding to the second optical sensors 14b-e, besides a first light outlet 194b, corresponding to the first optical sensor 14a. A light inlet 192b of the light-guiding part 19b covers the first function area 1224. The second optical sensors 14b-e are disposed corresponding to the plurality of second light outlets 196b, so that each second optical sensor 14b-e senses the first image for inspection through the corresponding second light outlet 196b and then generates a corresponding second inspection signal relative to the first image for inspection. Similarly, the optical sensors 14a-e can receive the first image for inspection together in principle. In other words, the first inspection signal and the four inspection signals can reflect the displaying properties of the whole first function area 1224 in principle. Additionally, the profiles of the light-guiding parts 18, 19a and 19b are conceptually shown in the figures. The actual profiles of the light-guiding parts 18, 19a and 19b depend on the structure of real products.

Figure 8:
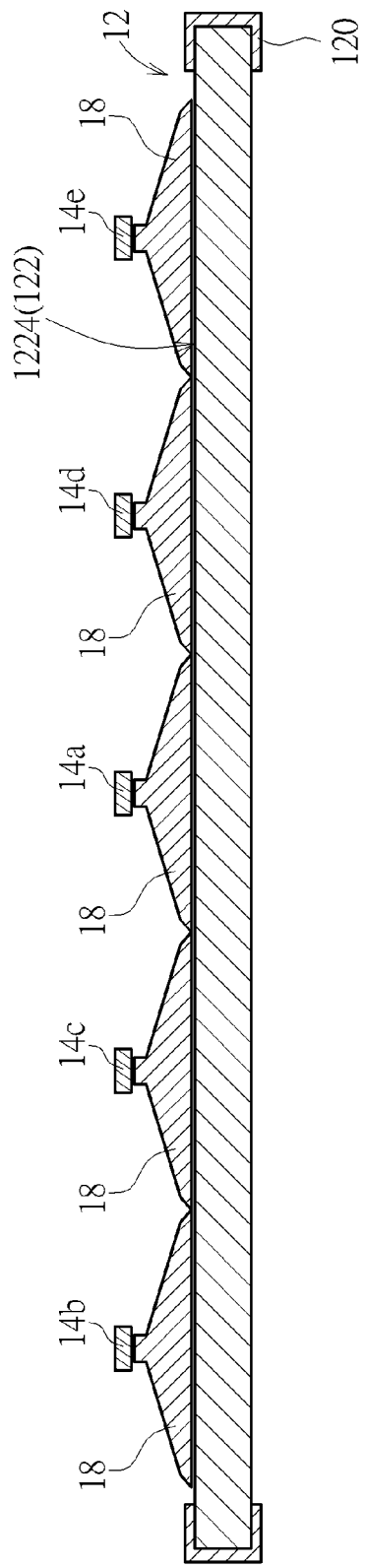
FIG. 8 is a sectional view of the displaying panel according to another embodiment in FIG. 4.

In the embodiment shown by FIG. 7, the optical sensors 14a-e sense the first image for inspection through the same light-guiding part 19b; however, the invention is not limited thereto. As shown by FIG. 8, the optical sensors 14a-e are disposed above the first function area 1224 (similar to the disposition shown by FIG. 4). Each optical sensor 14a-e uses one light-guiding part 18 correspondingly. The light-guiding parts 18 face the first function area 1224, so that the light inlets 182 cover the first function area 1224, for example by being arranged side by side in a row. The optical sensors 14a-e are disposed at the light outlets 184 correspondingly, so that the first optical sensor 14a senses the first image for inspection through the corresponding light-guiding part 18 and generates the first inspection signal relative to the first image for inspection and each second optical sensor 14b-e senses the first image for inspection through the corresponding light-guiding part 18 and generates a corresponding second inspection signal relative to the first image for inspection. Similarly, the optical sensors 14a-e can receive the first image for inspection together in principle. In other words, the first inspection signal and the four inspection signals can reflect the displaying properties of the whole first function area 1224 in principle.

In the above embodiments, the displaying panel 12 includes only one function area (i.e. the first function area 1224); however, the invention is not limited thereto. Please refer to FIG. 9 and FIG. 10. A displaying system 3, having a function of sensing displaying properties, of an embodiment according to the invention includes a casing 30, a displaying panel 32, a first optical sensor 34a, a third optical sensor 34b, and a controlling module 36. The controlling module 36 is electrically connected to the displaying panel 32, the first optical sensor 34a, and the third optical sensor 34b. The casing 30 includes a back cover 302 and a frame 304. The back cover 302 and the frame 304 are engaged with each other and form an accommodating space for accommodating the displaying panel 32, the first optical sensor 34a, the third optical sensor 34b, and the controlling module 36. The frame 304 forms a window 3042 to expose the displaying panel 32. The displaying panel 32 includes a fixing frame 320. The fixing frame 320 is used for fixing the displaying panel 32. The displaying panel 32 has a displaying surface 322 for displaying images. The displaying system 3 is structurally similar to the displaying system 1 mentioned above. For other descriptions about the components of the displaying system 3, please refer to the relevant descriptions of the components with the same name of the displaying system 1, which will not be described in addition.

Figure 9:
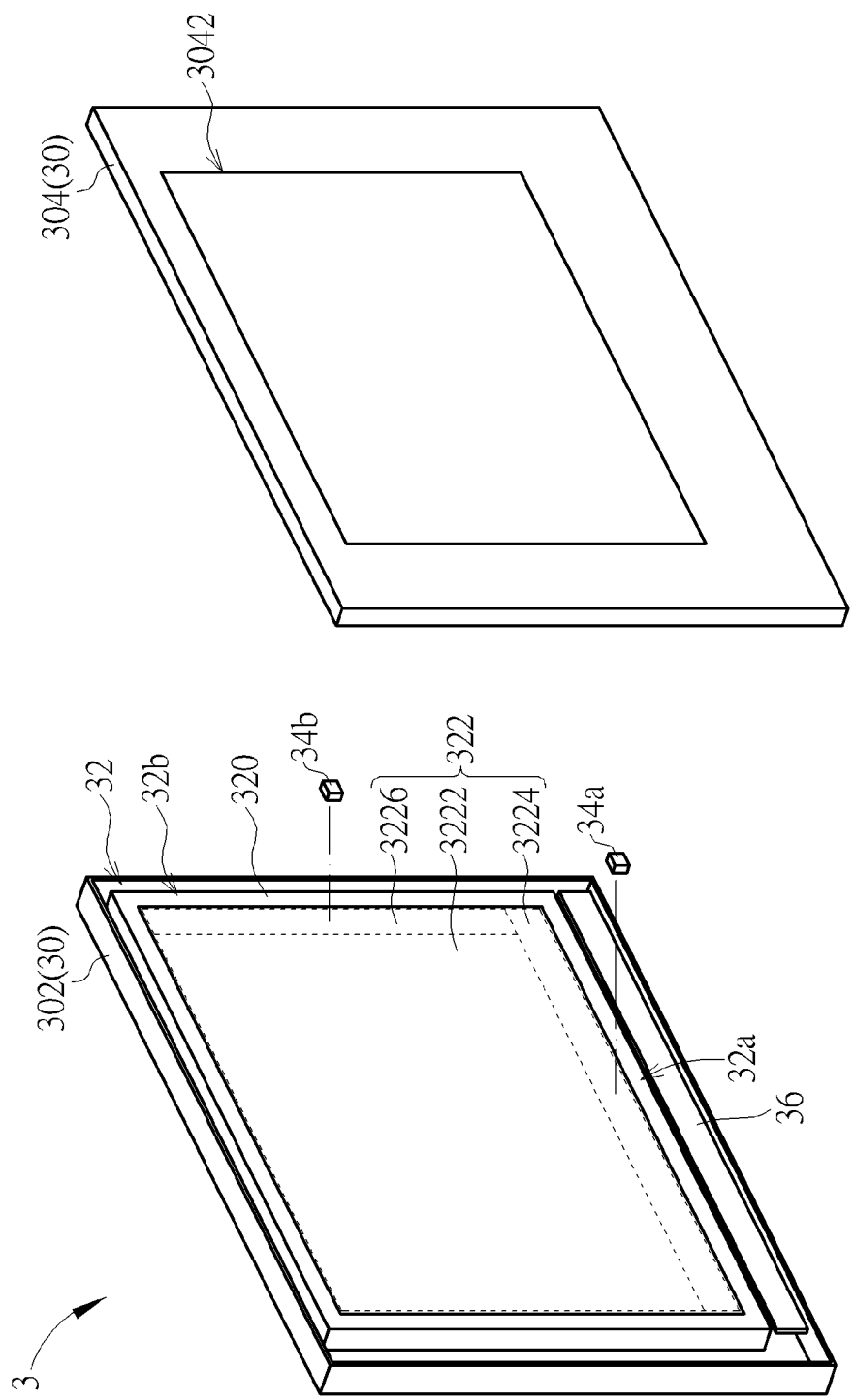
FIG. 9 is a partially exploded view of a displaying system having a function of sensing displaying properties of another embodiment according to the invention.
Figure 10:
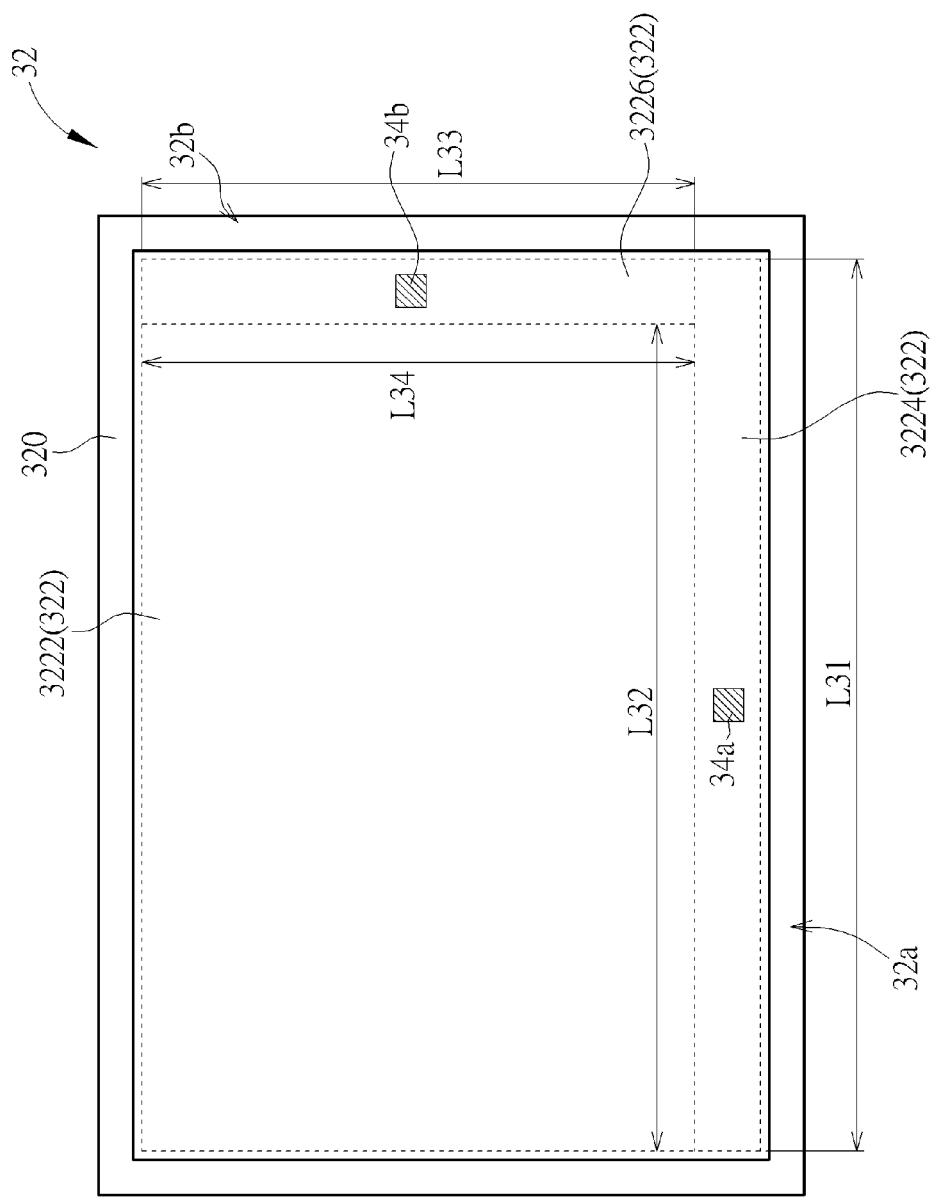
FIG. 10 is a front view of a displaying panel of the displaying system in FIG. 9.

For more details, in the embodiment, the displaying surface 322 of the displaying system 3 includes a presentation area 3222, a first function area 3224, and a second function area 3226 (which are shown by rectangles in dashed lines in FIG. 9 and FIG. 10). The first function area 3224 is located at a first side 32a of the displaying panel 32. The second function area 3226 is located at a second side 32b of the displaying panel 32. Therein, the presentation area 3222 is exposed through the window 3042. The first function area 3224 and the second function area 3226 are covered by the frame 304. In the embodiment, the first function area 3224 has a first length L31 in pixels parallel to the first side 32a. The presentation area 3222 has a second length L32 in pixels parallel to the first side 32a. The first length L31 in pixels is longer than the second length L32 in pixels. The second function area 3226 has a third length L33 in pixels parallel to the second side 32b. The presentation area 3222 has a fourth length L34 in pixels parallel to the second side 32b. The third length L33 in pixels is equal to the fourth length L34 in pixels.

Additionally, two portions of the area of the displaying surface 322 excluding the presentation area 3222 are defined as the function areas 3224 and 3226 respectively. In the embodiment, the function areas 3224 and 3226 are connected with each other to show an L-shaped profile. In logic, the two portions of the area can be re-defined as the function areas 3224 and 3226, so that the third length L33 in pixels of the second function area 3226 is longer than the fourth length L34 in pixels of the presentation area 3222 and the first length L31 in pixels of the first function area 3224 is equal to the second length L32 in pixels of the presentation area 3222. In practice, the corner portion of the L-shaped profile can even be not used as a portion of the function areas, so that the lengths L31 and L33 in pixels of the function areas 3224 and 3226 are equal to the lengths L32 and L34 in pixels of the presentation area 3222 respectively. In addition, in the embodiment, the displaying surface 322 is all divided into the presentation area 3222 and the required function areas 3224 and 3226; however, the invention is not limited thereto. For an example, the extent of the function areas 3224 and 3226 remains unchanged while the extent of the presentation area 3222 is reduced proportionally about the corner of the L-shaped profile as a reference point. In the case, the lengths L31 and L33 in pixels of the function areas 3224 and 3226 are longer than the lengths L32 and L34 in pixels of the presentation area 3222 respectively. Furthermore, in the case, the displaying surface 322 leaves an area which does not belong to the presentation area 3222 or the function areas 3224 and 3226. In practice, the frame 304 can be modified to reduce the window 1042 so that only the reduced presentation area 3222 is exposed through the window 1042. The modification of the window 1042 will not influence the implement of the invention. The above descriptions are also applied to the embodiments described above with FIG. 1 to FIG. 8, which will not be repeated in addition.

Furthermore, in the embodiment, the first optical sensor 34a is disposed corresponding to the first function area 3224, and the third optical sensor 34b is disposed corresponding to the second function area 3226. For convenience of explanation, in the embodiment, the optical sensors 34a and 34b right face the function areas 3224 and 3226 respectively; therein, the optical sensors 34a and 34b are located between the function areas 3224 and 3226 and the frame 304. Similarly, in practice, the optical sensors 34a and 34b can be disposed away from the function areas 3224 and 3226 through a light-guiding part, which can be understood by referring to the descriptions in the foregoing and will not be described further. Further, the displaying system 3 also can include more optical sensors (corresponding to the first function area 3224 or the second function area 3226). For the disposition of the optical sensors, please refer to the relevant descriptions of the optical sensors 14a-e and the light-guiding parts 18, 19a and 19b in the above embodiments, which will not be repeated in addition.

The controlling module 36 controls the displaying panel 32 to display a presentation image, a first image for inspection, and a second image for inspection within the presentation area 3222, the first function area 3224, and the second function area 3226 respectively. The first optical sensor 34a and the third optical sensor 34b sense the first image for inspection and the second image for inspection and then generate a first inspection signal relative to the first image for inspection and a third inspection signal relative to the second image for inspection respectively. The controlling module 36 receives the first inspection signal and the third inspection signal from the first optical sensor 34a and the third optical sensor 34b and adjusts displaying parameters of the displaying panel 32 according to the received first inspection signal and the received third inspection signal, so that the presentation image is adjusted for meeting a required requirement.

Figure 11:
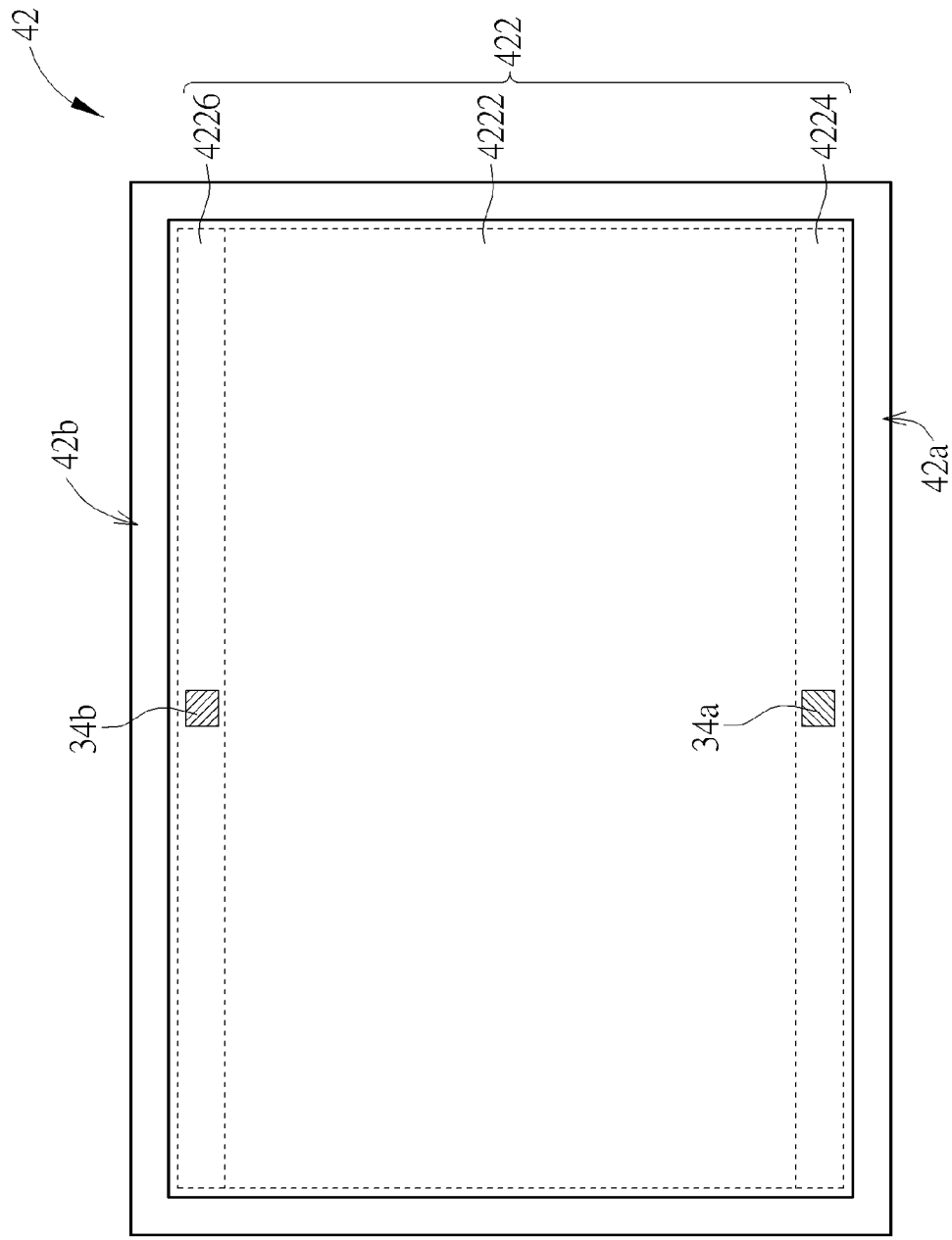
FIG. 11 is a front view of a displaying panel of another embodiment.

In the embodiment shown by FIG. 10, the first side 32a and the second side 32b are adjacent, so portions of the displaying surface 322 at the two adjacent sides of the displaying panel 32 are taken as the function areas; however, the invention is not limited thereto. As shown by FIG. 11, portions of a displaying surface 422 at two opposite sides 42a and 42b of a displaying panel 42 are taken as function areas 4224 and 4226, and a portion of a displaying surface 422 at the middle of the displaying surface 422 is taken as a presentation area 4222. The optical sensors 34a and 34b are disposed corresponding to the function areas 4224 and 4226. In the embodiment, in principle, a frame corresponding to the displaying panel 42 needs a corresponding modification to expose the presentation area 4222. Besides, the frame maintains covering the function areas 4224 and 4226. For other descriptions about the displaying panel 42, please refer to the relevant descriptions of the displaying panel 32, which will not be described in addition.

As illustrated with the above embodiments, the invention uses the portions of the displaying surface, which are not used for displaying the presentation image (e.g. the function areas 1224, 3224, 3226, 4224 and 4226), for sensing the displaying properties of the displaying panel, so even during the inspection of the displaying panel, the presentation image still can be continuously and fully displayed on the presentation area (e.g. the presentation areas 1222, 3222 and 4222) without any interference, which achieves the dynamic adjustment effect. Furthermore, the above embodiments are based on the condition that the function areas are covered by the frames, which is conducive to avoidance of interference with the user when the optical sensor senses the image for inspection and is also conducive to an artistic appearance of the displaying system. However, in practice, if the frame allows a portion of the function area to be exposed, the user can observe the image for inspection through the portion and then judge whether the image for inspection is displayed correctly.

Figure 12:
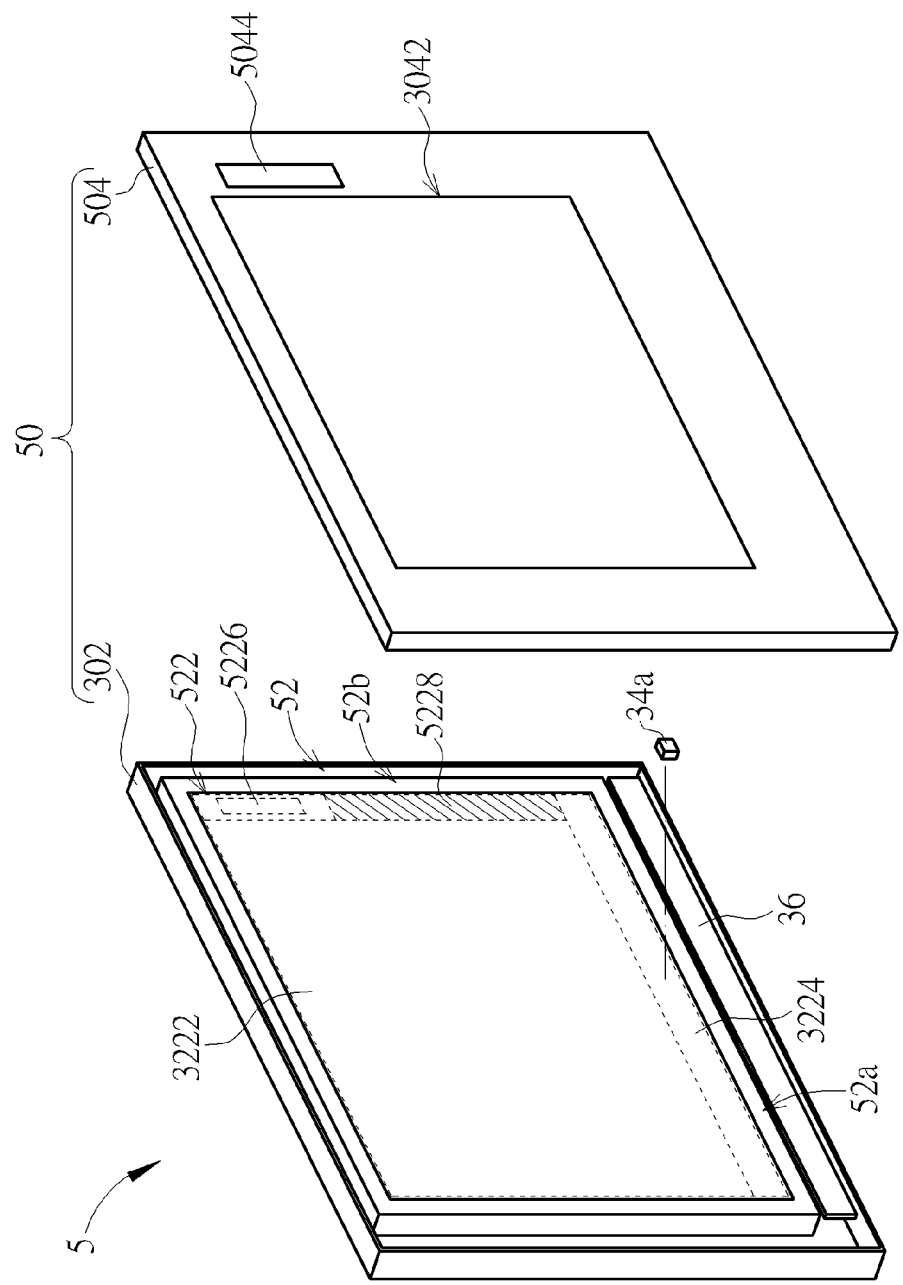
FIG. 12 is a partially exploded view of a displaying system having a function of sensing displaying properties of another embodiment according to the invention.

Furthermore, the portions of the displaying surface, which are not used for displaying the presentation image, can be used not only as the function area for sensing the displaying properties of the displaying panel but also for other purposes. As shown by FIG. 12, the displaying system 5 and the displaying system 3 are substantially structurally similar, so in principle, the displaying system 5 uses the same notations of the displaying system 3 for the components with the same names. A difference between the displaying system 5 and the displaying system 3 is that in the displaying system 5, a displaying surface 522 (shown by a rectangle in dashed lines in FIG. 12) of a displaying panel 52 thereon does not define an area like the second function area 3226 of the displaying panel 32, but the area thereon defines an indication area 5226 (presented by a rectangle in dashed lines in FIG. 12). The indication area 5226 is located at a second side 52b of the displaying panel 52. A frame 504 of a casing 50 of the displaying system 5 includes a light-permeable portion 5044 corresponding to the indication area 5226. Thereby, after the frame 504 is engaged with the back cover 302, the presentation area 3222 can be exposed through the window 3042 and the first function area 3224 and the indication area 5226 are covered by the frame 304. Therein, the light-permeable portion 5044 right faces the indication area 5226. Therefore, the controlling module 36 can control the displaying panel 52 to display an indication image or a light signal within the indication area 5226. The indication image or the light signal is visible through the light-permeable portion 5044; that is, the user can see the indication image or the light signal through the light-permeable portion 5044 from the outside of the displaying system 5. Therein, in practice, the indication image can be but not limited to a dynamic or static icon (e.g. trademark) or an indication message (e.g. scrolling text marquee). The light signal can be but not limited to a flickering or continuously lighting spot. Furthermore, in practice, the light-permeable portion 5044 can be achieved by a through hole structure or be formed of a light-permeable material (e.g. a light-permeable part which is embedded in an opaque frame to form the frame 504, or a portion of the frame 504 which is formed by a main body, which is made of a light-permeable material and is coated with a light shielding layer which exposes a partial surface of the main body to form the portion); however, the invention is not limited thereto. Furthermore, in the embodiment, the light-permeable portion 5044 is provided with a rectangular profile; however, in practice, the profile of the light-permeable portion 5044 can depend on the indication image. For example, the profile of the light-permeable portion 5044 shows a pattern (or the light-permeable portion 5044 can show a shape of a pattern). With light emitted from the indication area 5226, the light-permeable portion 5044 can achieve an optical effect of the pattern, e.g. a logo pattern or an indication pattern. For another example, the light-permeable portion 5044 is rectangular and is suitable for the indication message (e.g. scrolling text marquee).

Additionally, in practice, the image (including the image for inspection) displayed on the first function area 3224, the image (including the presentation image) displayed on the presentation area 3222, and the image (including the indication image or the light signal) displayed on the indication area 5226 can be combined into an image which is transmitted to the displaying system 5 and displayed by the displaying panel 52 under the control of the controlling module 36. For example, the images displayed on the first function area 3224 and the indication area 5226 are displayed by sub window. In addition, in the embodiment, the first function area 3224 of the displaying surface 522 exists at a first side 52*a* of the displaying panel 52; however, the invention is not limited thereto. For example, as shown by FIG. 12, an area of the displaying surface 522, which extends along the second side 52*b* of the displaying panel 52 and is covered by the frame 504, is not used as a portion of the indication area 5226 and is usable. For example, a function area 5228 (presented by a hatched rectangle in FIG. 12) which extends along the second side 52*b* of the displaying panel 52 can be combined into the first function area 3224 so that the first function area 3224 shows a L-shaped function area (i.e. a combination area of the function areas 3224 and 5228). Thereby, the combined first function area 3224 can provide much room for disposing the optical sensors so that the inspection through the optical sensors can reflect the displaying properties of the whole displaying panel 52 more precisely. For other descriptions about the components of the displaying system 5, please refer to the relevant descriptions of the components with the same name of the displaying system 3, which will not be described in addition. Additionally, in practice, according to the configuration of the areas of the displaying surface 522 which are covered by the frame 504, it is practicable to located the indication area 5226 at another side of the displaying panel 52. For an example based on the displaying surface 422 shown by FIG. 11, a part or the entire of the upper function area 4226 is taken as an indication area, so that the indication area and the function area 4224 are located at the two opposite sides of the displaying panel 42.

In the embodiment regarding the displaying system 5, the indication area 5226 and the first function area 3224 are separate from each other. However, in practice, if a required indication area needs not much room, for example, when the optical sensors does not need to occupy all room of the function area, a portion of a function area can be used as the indication area. For an example base on the displaying system 1 shown by FIG. 2, the first optical sensor 14*a* does not use the whole first function area 1224, so in practice, the first optical sensor 14*a* can be defined to include an indication area 12242 (presented by a rectangle in dashed lines in FIG. 2). The frame 104 includes a light-permeable portion 1044 (presented by a rectangle in dashed lines in FIG. 2) correspondingly, so that when the frame 104 is engaged with the back cover 102, the light-permeable portion 1044 right faces the indication area 12242. The controlling module 16 controls the displaying panel 12 to display an indication image or a light signal within the indication area 12242. The user can see the indication image or the light signal through the light-permeable portion 1044. For other descriptions about the light-permeable portion 1044 and the indication image or the light signal, please refer to the relevant descriptions of the indication image or the light signal of the displaying system 5, which will not be described in addition. Furthermore, similarly, in practice, the image (including the first image for inspection and the indication image or the light signal on the indication area 12242) displayed on the first function area 1224 and the image (including the presentation image) displayed on the presentation area 1222 can be combined into an image which is transmitted to the displaying system 1 and displayed by the displaying panel 12 under the control of the controlling module 16. For example, the image displayed on the first function area 1224 is displayed by a sub window.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A displaying system having a function of sensing displaying properties, the displaying system comprising:
   a displaying panel having a displaying surface, the displaying surface comprising a presentation area and a first function area, the first function area being at a first side of the displaying panel, the first function area having a first length in pixels parallel to the first side, the presentation area having a second length in pixels parallel to the first side, the first length in pixels being longer than or equal to the second length in pixels;
   a controlling module electronically connected to the displaying panel, the controlling module controlling the displaying panel to display a presentation image in the presentation area and a first image for inspection in the first function area;
   a first optical sensor electronically connected to the controlling module and disposed over the first function area, the first optical sensor directly facing a portion of the first function area and sensing a first sub-image of the first image for inspection to generate a first inspection signal relative to the first sub-image; and
   at least one second optical sensor electrically connected to the controlling module and disposed over the first function area, each second optical sensor directly facing another portion of the first function area and sensing a second sub-image of the first image for inspection to generate a corresponding second inspection signal relative to the second sub-image;
   wherein the controlling module controls the first optical sensor and the at least one second optical sensor to simultaneously sense the first sub-image and the at least one second sub-image respectively, and the controlling module receives the first inspection signal and the at least one second inspection signal from the first optical sensor and the at least one second optical sensor respectively and controls the displaying panel to display the presentation image in the presentation area according to the first inspection signal and the at least one second inspection signal individually;
   wherein the corresponding portions of the first image for inspection sensed by the first optical sensor and the at least one second optical sensor are identical, and the controlling module compares the first inspection signal and the at least one second inspection signal.

2. The displaying system of claim 1, wherein the at least one second optical sensor and the first optical sensor being disposed at an interval.

3. The displaying system of claim 1, further comprising a light-guiding part, wherein the light-guiding part has a light inlet and a first light outlet, the light inlet is disposed toward the first function area, and the first optical sensor is disposed at the first light outlet, so that the first optical sensor senses the first image for inspection through the first light outlet and generates the first inspection signal relative to the first image for inspection.

4. The displaying system of claim 3, wherein the light-guiding part has at least one second light outlet, the at least one second optical sensor is disposed corresponding to the at least one second light outlet, so that each second optical sensor senses the first image for inspection through the corresponding second light outlet and generates the corresponding second inspection signal relative to the first image for inspection, and the light inlet covers the first function area.

5. The displaying system of claim 3, wherein the light-guiding part has at least one second light outlet, and the at least one second optical sensor is disposed corresponding to the at least one second light outlet, so that each second optical sensor senses the first image for inspection through the corresponding second light outlet and generates the corresponding second inspection signal relative to the first image for inspection.

6. The displaying system of claim 1, further comprising at least two light-guiding parts, each light-guiding part having a light inlet and a light outlet, the at least two light-guiding part being disposed toward the first function area, the first optical sensor and the at least one second optical sensor being disposed corresponding to the at least two light outlets, so that the first optical sensor senses the first image for inspection through the corresponding light-guiding part and generates the first inspection signal relative to the first image for inspection, and each second optical sensor senses the first image for inspection through the corresponding light-guiding part and generates the corresponding second inspection signal relative to the first image for inspection.

7. The displaying system of claim 6, wherein the at least two light inlets cover the first function area.

8. The displaying system of claim 7, wherein the first optical sensor and the at least one second optical sensor are distributed uniformly over the first function area.

9. The displaying system of claim 1, further comprising a third optical sensor electrically connected to the controlling module, wherein the displaying surface comprises a second function area, the second function area is at a second side of the displaying panel, the second function area has a third length in pixels parallel to the second side, the presentation area has a fourth length in pixels parallel to the second side, the third length in pixels is longer than or equal to the fourth length in pixels, the controlling module controls the displaying panel to display a second image for inspection in the second function area, the third optical sensor is disposed corresponding to the second function area, the third optical sensor senses the second image for inspection to generate a third inspection signal relative to the second image for inspection.

10. The displaying system of claim 9, wherein the first side and the second side are adjacent to or opposite to each other.

11. The displaying system of claim 9, further comprising a light-guiding part, wherein the light-guiding part has a light inlet and a first light outlet, the light inlet covers the second function area, and the third optical sensor is disposed at the first light outlet, so that the third optical sensor senses the second image for inspection through the first light outlet and generates the third inspection signal relative to the first image for inspection.

12. The displaying system of claim 11, further comprising at least one fourth optical sensor, wherein the light-guiding part has at least one second light outlet, and the at least one fourth optical sensor is disposed corresponding to the at least one second light outlet, so that each fourth optical sensor senses the second image for inspection through the corresponding second light outlet and generates a corresponding fourth inspection signal relative to the second image for inspection.

13. The displaying system of claim 9, further comprising at least two light-guiding parts and at least one fourth optical sensor, each light-guiding part having a light inlet and a light outlet, the at least two light-guiding part being disposed toward the first function area so that the at least two light inlets cover the first function area, the at least one fourth optical sensor being electrically connected to the controlling module, the third optical sensor and the at least one fourth optical sensor being disposed corresponding to the at least two light outlets, so that the third optical sensor senses the second image for inspection through the corresponding light-guiding part and generates the third inspection signal relative to the second image for inspection, and each fourth optical sensor senses the second image for inspection through the corresponding light-guiding part and generates a corresponding fourth inspection signal relative to the second image for inspection.

14. The displaying system of claim 1, further comprising a frame, wherein the frame has a window and a light-permeable portion, the frame surrounds the displaying panel so that the presentation area is exposed out through the window and the frame covers the first function area, the first function area comprises an indication area corresponding to the light-permeable portion, the controlling module controls the displaying panel to display an indication image or a light signal in the indication area, and the indication image or the light signal is visible through the light-permeable portion.

15. The displaying system of claim 1, further comprising a frame, wherein the frame has a window and a light-permeable portion, the frame surrounds the displaying panel so that the presentation area is exposed out through the window, the displaying surface comprises an indication area, the frame covers the first function area and the indication area, the indication area corresponds to the light-permeable portion, the controlling module controls the displaying panel to display an indication image or a light signal in the indication area, and the indication image or the light signal is visible through the light-permeable portion.

16. The displaying system of claim 15, wherein the indication area is at a second side of the displaying panel.

17. The displaying system of claim 15, wherein a profile of the light-permeable portion shows a pattern.

18. The displaying system of claim 1, further comprising a frame, wherein the frame has a window and an opaque cover portion, and the opaque cover portion covers the first function area so that the first image is invisible from the outside of the displaying system.

* * * * *